United States Patent

Kashiwagi

[11] Patent Number: 5,981,952
[45] Date of Patent: Nov. 9, 1999

[54] DYNAMIC FOCUSING APPARATUS FOR CATHODE-RAY TUBE DEVICE

[75] Inventor: Shigeru Kashiwagi, Noda, Japan

[73] Assignee: Victor Company of Japan, Ltd., Yokohama, Japan

[21] Appl. No.: 08/975,333

[22] Filed: Nov. 20, 1997

[30] Foreign Application Priority Data

Nov. 21, 1996 [JP] Japan .................................. 8-325952
Nov. 22, 1996 [JP] Japan .................................. 8-327957

[51] Int. Cl.$^6$ ...................................................... H01J 29/58
[52] U.S. Cl. ........................................ 250/382; 250/368.21
[58] Field of Search ........................ 315/368.21, 368.22, 315/382, 382.1, 408; 348/806

[56] References Cited

U.S. PATENT DOCUMENTS

| | | | |
|---|---|---|---|
| 4,587,465 | 5/1986 | Truskalo | 315/382 |
| 5,043,638 | 8/1991 | Yamashita | 315/382.1 |
| 5,466,994 | 11/1995 | Akimoto et al. | |
| 5,530,488 | 6/1996 | Rilly et al. | 348/704 |
| 5,614,792 | 3/1997 | Ogishima et al. | 315/382.1 |
| 5,831,400 | 11/1998 | Kim | 315/382.1 |

FOREIGN PATENT DOCUMENTS

| | | |
|---|---|---|
| 0 146 345 | 6/1985 | European Pat. Off. . |
| 63-046877 | 2/1988 | Japan . |
| 03159417 | 7/1991 | Japan . |
| 04032369 | 2/1992 | Japan . |
| 5-161028 | 6/1993 | Japan . |
| 6-205235 | 7/1994 | Japan . |
| 7-058975 | 1/1995 | Japan . |
| 7-272641 | 10/1995 | Japan . |
| 9-284590 | 10/1997 | Japan . |
| 63-208371 | 8/1998 | Japan . |

*Primary Examiner*—Edward P. Westin
*Assistant Examiner*—Nikita Wells
*Attorney, Agent, or Firm*—Eugene Lieberstein; Michael N. Meller

[57] ABSTRACT

A dynamic focusing apparatus is comprised of a parabaolic voltage generating device for generating a parabolic voltage VpbI across a capacitor 9M by applying a horizontal flyback pulse a series circuit of an inductor 8 and the capacitor, a coupling device 10 for supplying the parabolic voltage to a focus electrode "f" of a cathode-ray tube, the capacitor which includes a plurality of capacitors 9S, an electronic switching device 11 for selectively connecting some of the plurality of capacitors for a time duration corresponding to an approximate center of a horizontal period and for disconnecting the some of the plurality of capacitors for other duration, and a switching control device for controlling the electronic switching device.

7 Claims, 9 Drawing Sheets

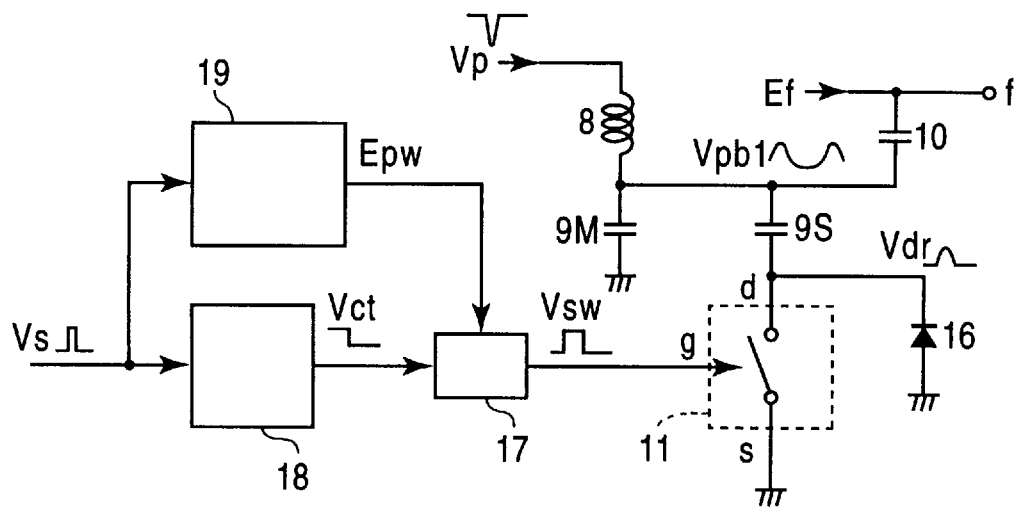
Fig. 6
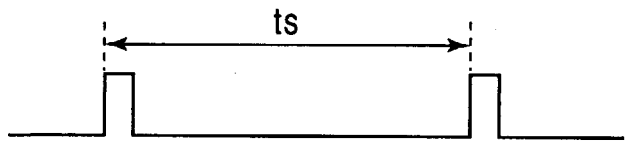
Fig. 7(A) Vs
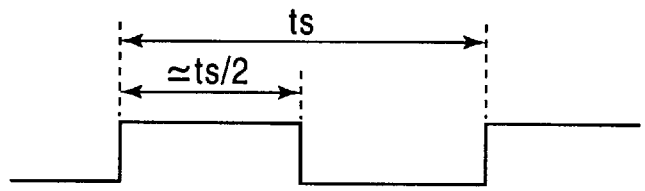
Fig. 7(B) Vct
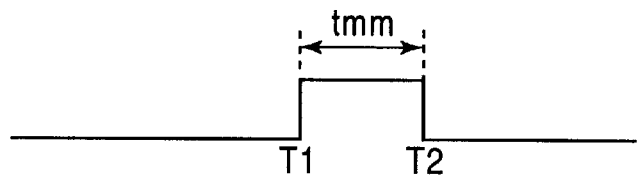
Fig. 7(C) Vsw
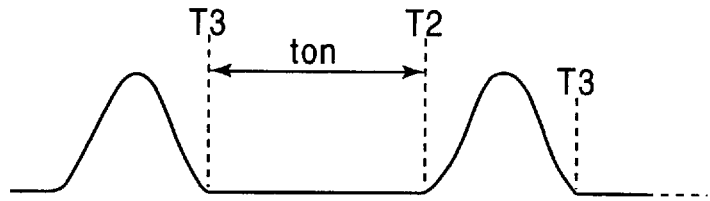
Fig. 7(D) Vdr
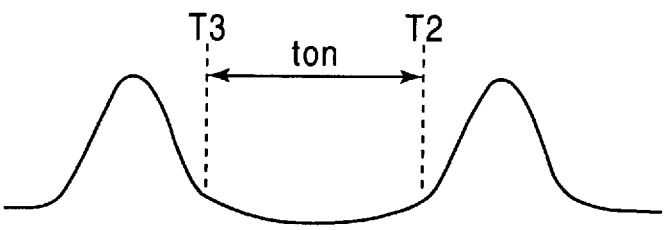
Fig. 7(E) Vpb1

*Fig. 11(A)* Vs 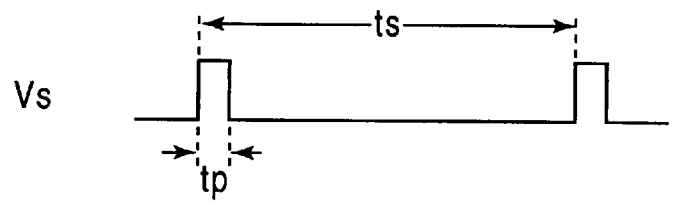
*Fig. 11(B)* Vst 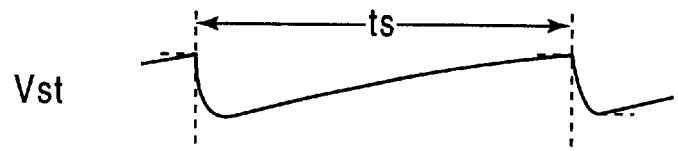
*Fig. 11(C)* Vstc 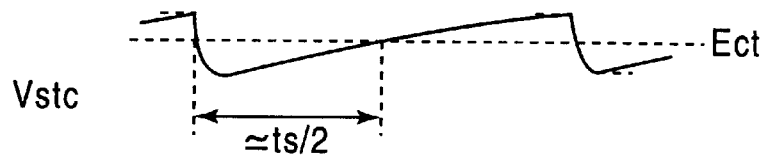
*Fig. 11(D)* Vct 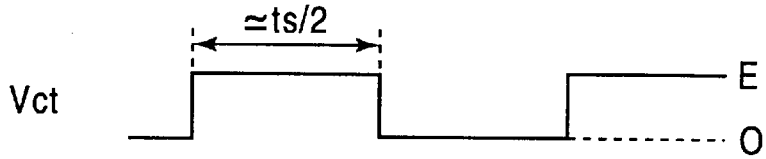

DYNAMIC FOCUSING APPARATUS FOR CATHODE-RAY TUBE DEVICE

BACKGROUND OF THE INVENTION

1. Field of the Invention

The present invention relates to a dynamic focusing apparatus for a cathode-ray tube display device and, particularly, to the dynamic focusing apparatus which generates an optimum waveform of focus voltage to the cathode-ray tube display device responsive to a variety of horizontal deflection frequencies and horizontal deflection angles.

2. Description of the Related Art

A dynamic focusing apparatus of the prior art will be described referring to FIGS. 1 through 5.

A horizontal output stage 1 is supplied a drive signal Vd from a preceding device (not shown) and outputs a pulse signal Vh and further, supplies a horizontal deflection current Iy to a horizontal deflection coil 2.

The pulse signal Vh is supplied to a flyback transformer primary coil 3a, then a high voltage pulse Vhv is generated by a secondary coil 3b. The high voltage pulse Vhv is rectified by i rectifier 4 to a direct current (DC) high voltage HV and is supplied to an anode terminal "a" for driving a cathode-ray tube (not shown).

Resistors 5, 7 and a variable resistor 6 comprise a dividing network for obtaining a focus voltage Ef by dividing the DC high voltage TIV. The focus voltage Ef is supplied to a focus terminal "f" for driving a focus electrode of the cathode-ray tube.

When a cathode-ray tube display device is a simple one of which the focus voltage Ef is simply a DC voltage, a dynamic focusing apparatus operates by a construction mentioned in the above, and does not need such an additional construction mentioned in the following. A description will be given that the focus voltage Ef is set to be larger at both horizontal edges of an image displayed on a cathode-ray tube so as to obtain a fine focused image on a full area thereof in the following.

The flyback transformer 3 has a third coil 3c, which generates a horizontal flyback pulse Vp and supplies it to a series circuit of an inductance 8 and an integrating capacitor 9. As a sawtooth waveform of current due to the horizontal flyback pulse Vp flows the series circuit, a parabolic voltage Vpb is generated across the capacitor 9. A parabolic voltage Vpb is added to the focus voltage Ef through a DC blocking capacitor 10, and supplied to the focus terminal "f".

When a horizontal frequency of the cathode-ray tube display device is a predetermined one, the capacitor 9 is allowed to have a fixed value. But, when the horizontal frequency thereof is variable, an amplitude of the parabolic voltage Vpb changes widely. Higher the horizontal frequency thereof becomes, smaller the parabolic voltage Vpb becomes. The change of the parabolic voltage Vpb does not agree to the focus voltage Ef which is required to be a fixed value.

As shown in FIG. 1, when the horizontal frequency takes plural values, a plurality of additional capacitors such as capacitors 9a, 9b, and 9c are provided and selected by switches 11a, 11b, and 11c responding to the changed horizontal frequency.

The capacitor 9 is fixed for the highest frequency of the cathode-ray tube display device for example, then an adequate value of the parabolic voltage Vpb is generated, and the switches 11a, 11b, and 11c are kept to be open. The switches 11a, 11b and 11c are successively made closed as required for adding a capacitance parallel with the capacitor 9 and holding the value of the parabolic voltage Vpb constant as the horizontal frequency becomes lower.

The switching of the switches 11a, 11b and 11c may be manually operated or may be electrically controlled by an electronic controller so as to hold the parabolic voltage constant. A switch control device 12 is a device for switching electrically the switches 11a, 11b and 11c in FIG. 1.

The resultant focus voltage Ef is a parabolic wave which is high at both ends of a screen of the cathode-ray tube horizontally and low at the center region thereof as shown in FIG. 2. Almost whole screen area of the cathode-ray tube shows a finely focused picture by the focus voltage Ef.

However, it is not sufficient to get finer picture which is obtained by such a parabolic voltage as shown in FIG. 2. FIG. 3 shows the most ideal parabolic pattern of the focus voltage. A gradient of a curve of the parabolic voltage is preferable to be steep at both ends of the screen horizontally, and is preferable to be small at the center region thereof which is like a bathtub-shape.

FIG. 4 shows a method of obtaining such a parabolic wave as shown in FIG. 3 in the prior art. A parabolic voltage Vpb1 generated from such an electronic circuit as shown in FIG. 1 is inputted to a slicing circuit comprising a resistor 15A, a diode 13, a capacitor 14, and a resistor 15B. A center region of the parabolic voltage Vpb1 is sliced by the slicing circuit into a deformed parabolic voltage Vpbs as shown in FIG. 5. The deformed parabolic voltage Vpbs is supplied to the focus terminal "f" of the cathode-ray tube through a DC blocking capacitor 10 shown in FIG. 1.

A drawback of the slicing circuit is; the resistors 15A and 15B have a Large power loss, the center region of the deformed parabolic voltage Vpbs is flat, and the focus function thereof is not ideal as the deformed parabolic voltage Vpbs does not agree with the most ideal parabolic pattern of the focus voltage shown in FIG. 3.

The dynamic focusing apparatus of the prior art shown in FIG. 1 changes a capacitance value in steps, therefore, a number of tunable horizontal frequency is limited by the number of switches and associated capacitors which are provided thereof. Accordingly, the parabolic voltage for further horizontal frequency may not be realized to an optimum value, therefore, the picture on the cathode-ray tube becomes out; of focus. This problem may be solved by increasing the number of the switches and the capacitors, then, the dynamic focusing apparatus will be complicated, and a manufacturing cost thereof will go up.

If the parabolic voltage Vpb is continuously changeable responding automatically to a changed horizontal frequency, such a dynamic focusing apparatus would be quite advantageous in performance.

In the above, a method of changing the parabolic voltage responding to the variations of the horizontal frequency in the prior art is described.

A horizontal deflection angle may change widely in some cathode-ray tube display device such as a display monitoring device for computers, and wide screen TV receivers. When the horizontal deflection angle is smaller than the standard one, a horizontal drive current becomes smaller, as a result, the parabolic voltage becomes smaller. On the contrary, when the horizontal deflection angle is larger than the standard one, the parabolic voltage becomes larger, and the focus voltage is too large at the both ends of the horizontal scanning line to obtain a uniformly focused picture. Thus, the parabolic voltage Vpb is needed to be controlled so as to obtain a finely focused picture when the horizontal deflection angle is changed.

SUMMARY OF THE INVENTION

Accordingly, a general object of the present invention is to provide a dynamic focusing apparatus for supplying an adequate focus voltage to a cathode-ray tube display device and for obtaining a finely focused picture over a full screen area.

Another object of the present invention is to provide a dynamic focusing apparatus for supplying an adequate focus voltage to a cathode-ray tube display device which utilizes a multiple number of horizontal deflection frequencies and a variety of horizontal deflection angles.

Further and another object of the present invention is to provide a dynamic focusing apparatus comprising; a parabolic voltage generating device for generating a parabolic voltage across a capacitance device by supplying a horizontal flyback pulse to a series circuit including the capacitor and an inductor, a coupling circuit for supplying the parabolic voltage to a focus electrode of a cathode-ray tube, the capacitance device including a plurality of capacitors, an electronic switch for activating a part of the plurality of the capacitors during an ON period which corresponds to an approximate center region of a horizontal scanning period and deactivating the part of the plurality of the capacitors during an OFF period which corresponds to a rest of the horizontal scanning period, and a switching control device for varying the ON period of the part of the plurality of the capacitors.

BRIEF DESCRIPTION OF THE DRAWINGS

FIG. 6 shows a dynamic focusing apparatus of first embodiment of the present invention;

FIG. 7(A) shows a waveform of a standard pulse which synchronizes with a horizontal line frequency;

FIG. 7(B) shows a waveform of a central signal outputted from a center-signal generating circuit;

FIG. 7(C) shows a waveform of a square pulse for controlling a parabolic voltage;

FIG. 7(D) shows a waveform of parabolic voltage corresponding to side edges of a screen;

FIG. 7(E) shows a waveform of the parabolic voltage obtained by the present invention;

FIG. 11(A) shows a reference pulse signal in a horizontal line period;

FIG. 11(B) shows a first sawtooth wave;

FIG. 11(C) shows a second sawtooth wave;

FIG. 11(D) shows a central signal of a square wave;

DETAILED DESCRIPTION OF THE PREFERRED EMBODIMENTS

Figure 1:
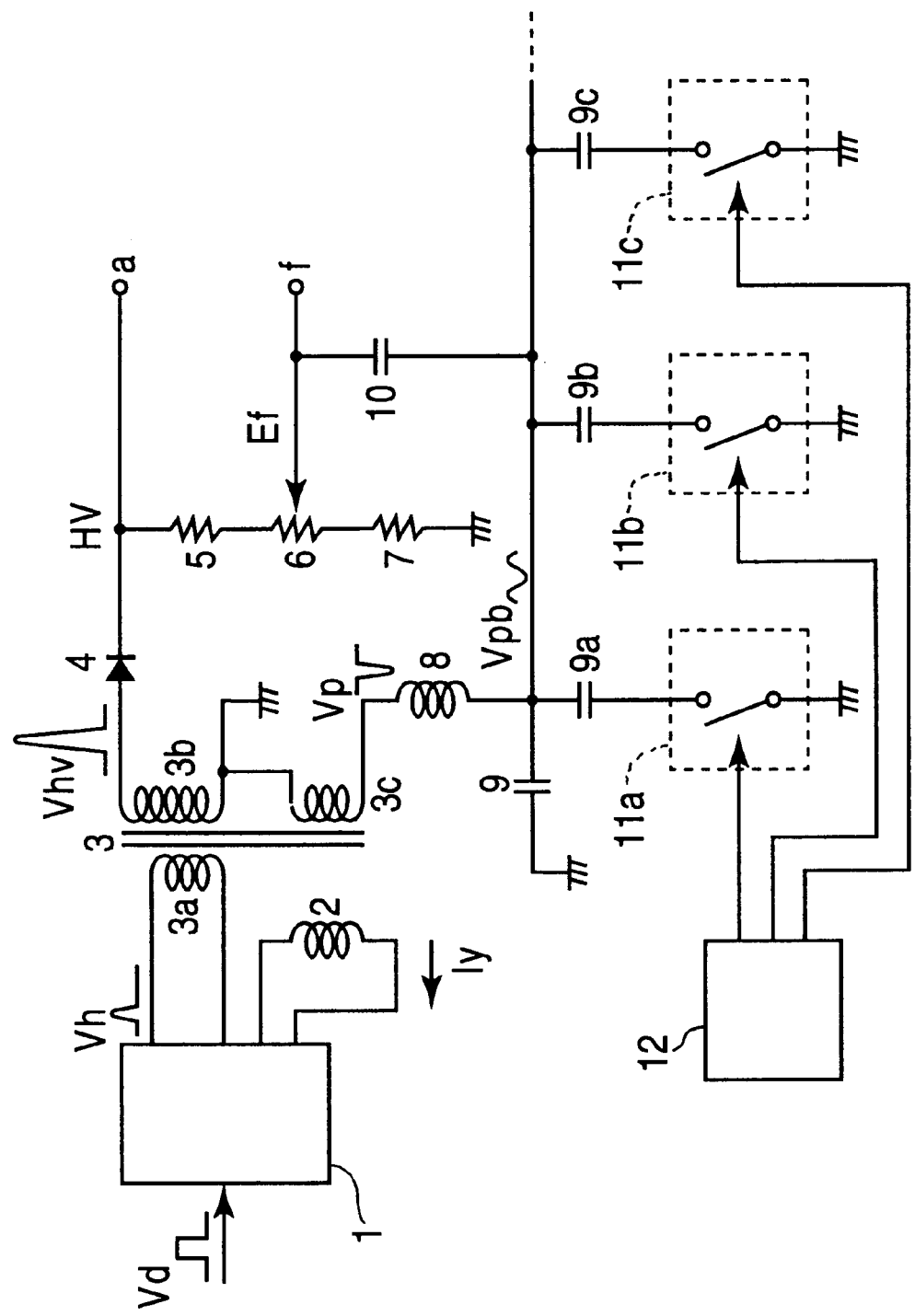
FIG. 1 shows a circuit diagram of a prior art.
Figure 2:
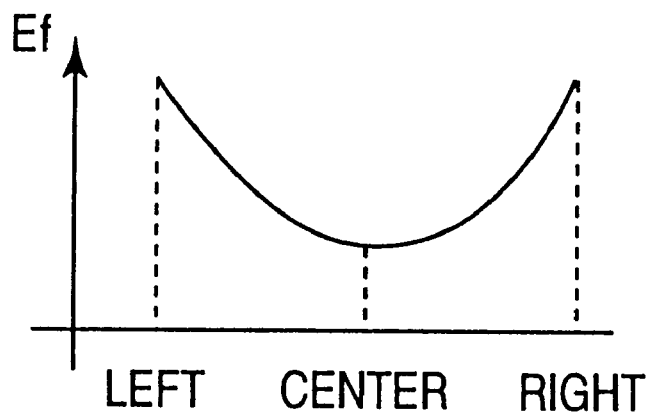
FIG. 2 shows a waveform of dynamic focus voltage generated by the prior art shown in FIG. 1.
Figure 3:
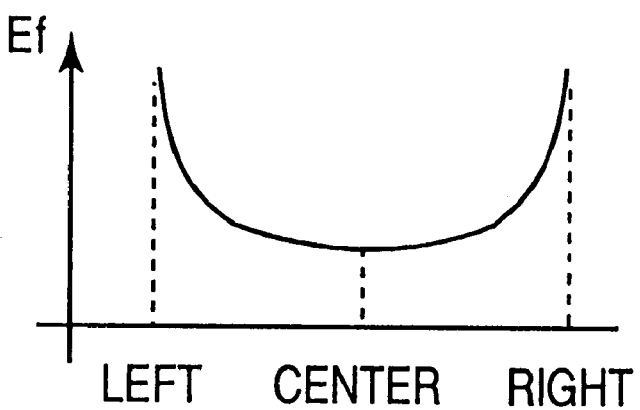
FIG. 3 shows an ideal waveform of dynamic focus voltage.
Figure 4:
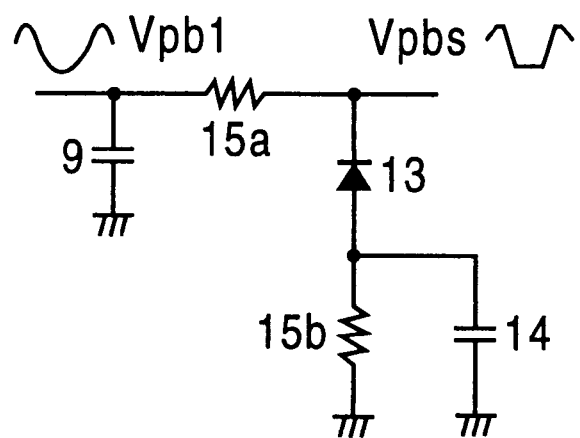
FIG. 4 shows another circuit diagram of a prior art.
Figure 5:
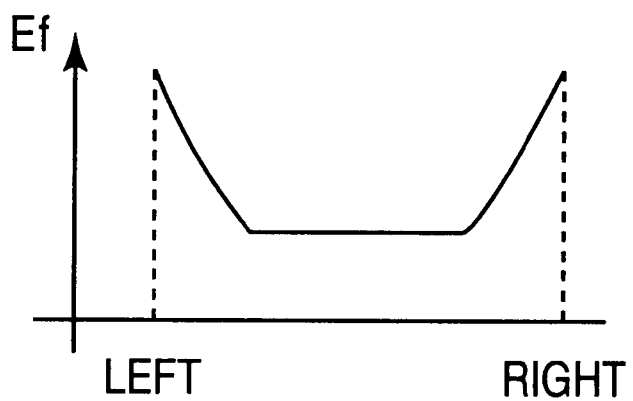
FIG. 5 shows a waveform of dynamic focus voltage obtained by using the circuit shown in FIG. 4.

A dynamic focusing apparatus of the present invention will be described in detail with reference to the accompanying drawings, in which same reference numerals and symbols are used to denote like or equivalent elements used in the aforementioned prior arts, and detailed explanation of such elements are omitted for simplicity.

[First Embodiment]

Referring to FIGS. 1 and 6, the horizontal flyback pulse Vp of negative polarity supplied from the third coil 3C of the flyback transformer 3 is supplied to a capacitor 9M through the inductor 8. Then, a parabolic voltage Vpb1 is generated across the capacitor 9M. The parabolic voltage Vpb1 is added to the focus voltage Ef through the direct current (DC) blocking capacitor 10, and supplied to a focus terminal "f" for a cathode-ray tube (CRT).

It is a feature of the embodiment of the present invention that a capacitance for integration is comprised of the main capacitor 9M and a sub capacitor 9S connected in series to an electronic switch 11 and to a diode 16. The electronic switch 11 alternates on and off within a horizontal line period responding to a square pulse Vsw outputted from a monostable multivibrator 17.

A center signal generating circuit 18 is supplied with a standard pulse Vs, and outputs a central signal Vct which changes its level at the center region of the horizontal line period or at a point slightly before the center. The central signal Vct triggers the monostable multivibrator 17. Moreover, a pulse width control signal Epw outputted from a pulse width control device 19 controls a pulse width "tmm" of the square pulse Vsw.

A basic operation of the dynamic focusing apparatus shown in FIG. 6 will be explained referring to FIGS. 7(A) through 7(F). FIG. 7(A) shows the standard pulse Vs which synchronizes with the horizontal line period "ts", and a normal horizontal synchronizing pulse can serve this purpose. FIG. 7(B) shows the central signal Vct outputted from the center signal generating circuit 18, which changes its level at an approximate center T1 of the horizontal line period "ts". The monostable multivibrator 17 is triggered at the approximate center T1, and outputs the square pulse Vsw having the pulse width "tmm" as shown in FIG. 7(C). When the square pulse Vsw is applied to a control terminal "g" of the electronic switch 11, the electronic switch 11 closes across terminals "d" and "s" at a time T2, corresponding to the falling edge of the square pulse Vsw. The square pulse Vsw rises at a time T1, the center of the central signal Vct and falls at a time T2 which is at the rear end of the pulse width "tmm".

Soon after the electronic switch 11 becomes open, a voltage Vdr which is a part of the parabolic voltage appears across the terminals "d" and "s", reaches its peak value, and falls down as shown in FIG. 7(D). When the voltage Vdr goes down below zero at a time T3, the diode 16 becomes conductive and keeps the voltage Vdr to be zero. This state continues for another period until the time T2, and the voltage Vdr rises again.

The voltage of the terminal "d" of the electronic switch 11 or the cathode terminal of the diode 16 being zero means that the electronic switch 11 is closed across the terminals "d" and "s". The period of the diode 16 and the electronic switch 11 kept closed is a period "ton" which is at the approximate center of the horizontal line period "ts" as shown in FIG. 7(D). The capacitors 9M and 9S are parallel with each other which increases capacitance during the period "ton". The amplitude of the parabolic voltage Vpb1 is held small during the period "ton" between the time T3 and the time T2.

As a result, the parabolic voltage Vpb1 varies steeply at the beginning and the ending of the horizontal line period "ts" and varies gradually at the central part thereof as shown in FIG. 7(E)

As mentioned in the above, the parabolic voltage Vpb1 obtained by the dynamic focusing apparatus of the present invention shown in FIG. 6 is different from the simple parabolic voltage Vpb obtained by the dynamic focusing apparatus of the prior art shown in FIG. 1. An ideal focusing voltage to be applied to an actual cathode-ray tube is similar to the parabolic voltage Vpb1. Therefore, the parabolic voltage Vpb1 of the present invention will provide a finely focused picture on the full area of the cathode-ray tube.

Actually, an n-type FET (field effect transistor) may be used for the electronic switch 11. For the n-type FET, an operation of the electronic switch 11 will be given by connecting a gate terminal as the control terminal "g" of the electronic switch, a drain terminal as the terminal "d" thereof, and a source terminal as the terminal "s" thereof. Here, a diode-junction between the drain and the source may substitute for the diode 16.

An operation of the dynamic focusing apparatus of the present invention shown in FIG. 6 for various values of the horizontal line period "ts" will be explained referring to FIGS. 8(A) through 8(C). Here, the operation thereof will be explained about three values of the horizontal line period "ts" which becomes shorter in the order from "ts1" to "ts3". When the horizontal Line period is shorter than normal, and the capacitor 9M is fixed, the amplitude of the parabolic voltage Vpb1 is smaller than an ideal value for fine focus.

In the dynamic focusing apparatus of the present invention shown in FIG. 6, the closed period "ton" is changed with respect to the horizontal line period "ts" respectively, such as a first closed period "ton1" for the first horizontal line period "ts1", a second closed period "ton2" for the second horizontal line period "ts2", and a third closed period "ton3" for the third horizontal line time "ts3". When the short closed period "ton" is applied to the short horizontal line period "ts", the capacitors 9M and 9S are connected with each other in parallel, as a result, an amplitude Epp of the parabolic voltage Vpb1 increases. Thus, the amplitude Epp may be kept approximately constant by setting the closed period "ton" appropriately.

Figure 8A:
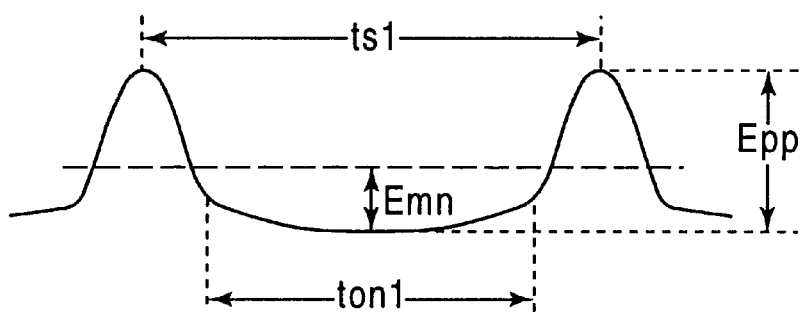
FIGS. 8(A) through 8(C) show waveforms of parabolic voltages corresponding to various horizontal line periods.

FIG. 8(A) shows an actual wave form of the parabolic voltage Vpb1, wherein the horizontal line period "ts" is 29.6 µs and shown as "ts1", the closed period "ton" is 24.0 µs and shown as "ton1", and a pulse width "tmm" (not shown) of the square pulse Vsw is 14.5 µs and named "tmm1".

Figure 8B:
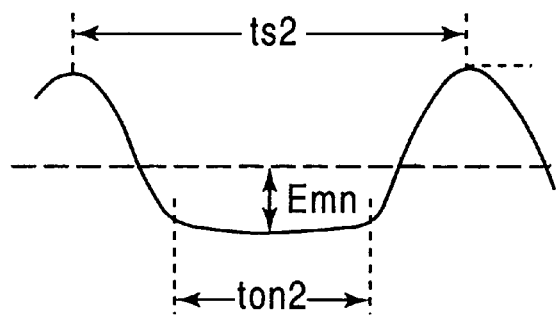

FIG. 8(B) shows another actual wave form of the parabolic voltage Vpb1, wherein the horizontal line period "ts" is 26.3 µs and shown as "ts2", the closed period "ton" is 18.5 µs and shown as "ton2", and the pulse width "tmm" (not shown) is 10.5 µs and named "tmm2".

Figure 8C:
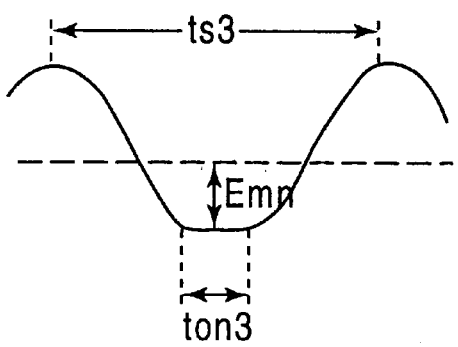

FIG. 8(C) shows further and another actual wave form of the parabolic voltage Vpb1, wherein the horizontal line period "ts" is 23.3 µs and shown as "ts3", the closed period "ton" is 12.5 µs and shown as "ton3", and the pulse width "tmm" (not shown) is 7.0 µs and named "tmm3".

Figure 9A:
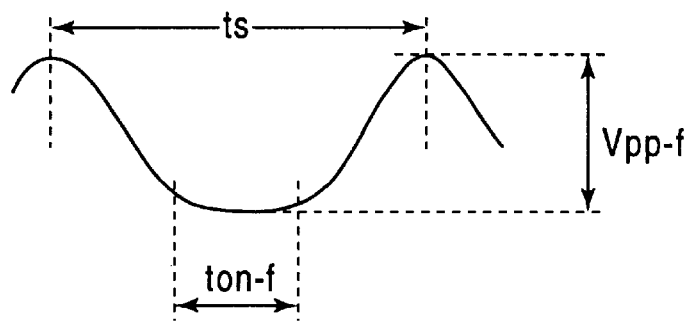
FIG. 9(A) shows a typical waveform of dynamic focusing corresponding to a normal horizontal deflection angle.
Figure 9B:
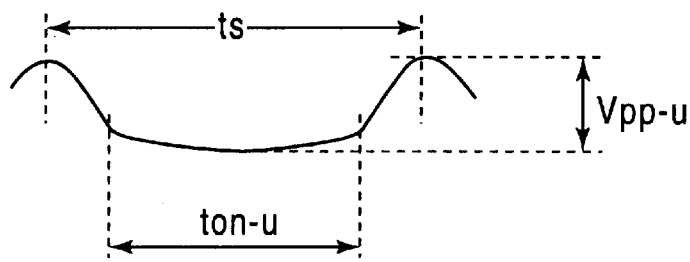
FIG. 9(B) shows a waveform of dynamic focusing corresponding to a smaller horizontal deflection angle.

An operation of the dynamic focusing apparatus of the present invention for adapting the parabolic voltage Vpb1 to a changed horizontal deflection angle will be explained referring to FIGS. 9(A) and 9(B). FIG. 9(A) shows the parabolic voltage Vpb1 of an normal state wherein the closed period "ton" is given as a full size closed period "ton-f", and the amplitude Vpp is a full size amplitude Vpp-f, which are those for the full deflection angle picture.

When horizontal scanning angle is smaller than normal, namely under-scanning, the amplitude Vpp of the parabolic voltage Vpb1 is adjusted to be smaller for obtaining fine focusing over the full area of the picture. Then, an under-scanning closed period "ton-u" of the electronic switch 11 is made to be longer than normal by extending the pulse width "tmm" of the square pulse Vsw which is outputted from the monostable multivibrator 17. As explained before, the closed period "ton" increases and the amplitude Vpp of the parabolic voltage Vpb1 decreases to be an under-scanning amplitude Vpp-u, as shown in FIG. 9(B).

Figure 10:
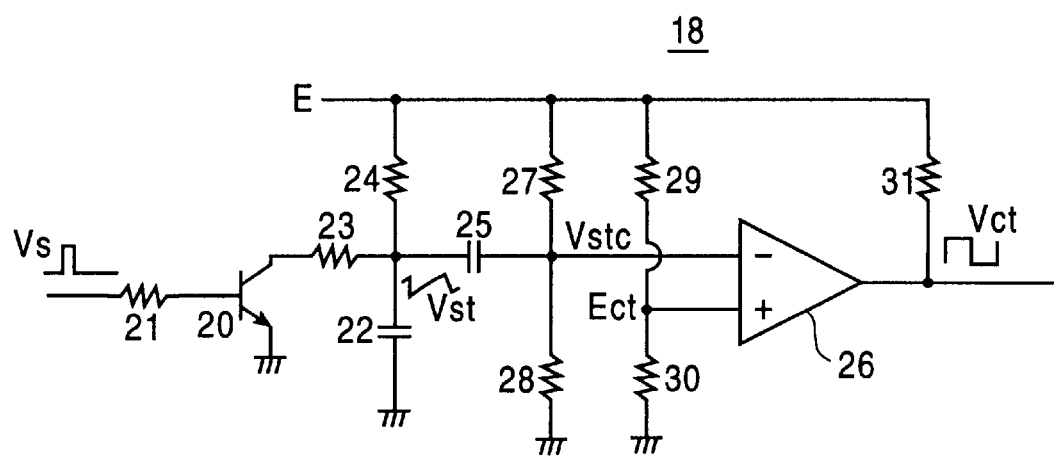
FIG. 10 shows an example of a central signal generating device.

The center signal generating circuit 18 is needed for responding to a plurality of the horizontal line period "ts" and detecting an approximate center position thereof. FIG. 10 shows an example of the center signal generating circuit 18 which is comprised of a switching transistor 20 supplied with the standard pulse Vs at a base terminal thereof through a base resistor 21, a capacitor 22 for charging and discharging, a discharging resistor 23, and a charging resistor 24. In FIG. 10, a sawtooth voltage Vst having a period equal to the horizontal line period "ts" is generated across the capacitor 22 in response to the standard pulse Vs. A coupling capacitor 25 is a capacitor for blocking direct current component of the sawtooth voltage Vst and coupling it to a comparator 26. Resistors 27 through 30 are direct current bias resistors for the comparator 26, and a resistor 31 is a load resistor thereof.

An operation of the center signal generating circuit 18 will be explained referring to FIGS. 11(A) through 11(D). FIG. 11(A) shows the standard pulse Vs having the horizontal line period "ts" and a pulse width period "tp". The switching transistor 20 turns on across collector and emitter terminals thereof for the pulse width period "tp" shown in FIG. 11(A). Through the period "ts", an electric charge of the capacitor 22 discharges through the resistor 23 and the transistor 20. The transistor 20 turns off for the period thereof except for the pulse width period "tp", and then, the capacitor 22 is charged up by a current supplied from a 1)C source E through the resistor 24. As a result, the sawtooth voltage Vst appears across the capacitor 22 as shown in FIG. 11(B).

A DC component of the sawtooth voltage Vst is blocked by the coupling capacitor 25. Then the sawtooth voltage Vst is given another DC component through the resistors 27 and 28 and becomes a sawtooth voltage Vstc. The sawtooth voltage Vstc is supplied to an inverting terminal of the comparator 26. A DC voltage Ect is supplied to a noninverting terminal of the comparator 26 through the resistors 29 and 30. When respective dividing ratios of the resistor 27 to the resistor 28 and of the resistor 29 to the resistor 30 are almost same, a cross point between the sawtooth voltage Vstc and the DC voltage Ect resides almost at the center of the horizontal Line period "ts" as shown in FIG. 11(C). Thus, the central signal Vet forms a square wave which changes its level approximately at the center of the horizontal Line period "ts" as shown in FIG. 11(D).

Figure 12A:
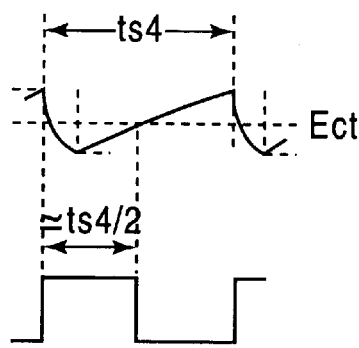
FIGS. 12(A) and 12(B) show relations between a sawtooth wave and a horizontal line period.

Whatever the value of the horizontal line period "ts", it always becomes that the central signal Vct changes its level approximately at the center thereof, in other words, the pulse width of the central signal Vct is approximately a half of the horizontal line period "ts". When the horizontal line period "ts" is changed from ts4 to ts5, the period of the sawtooth voltage Vstc generated from the central point detecting device 18, also changes to concur with the horizontal line period "ts", thus an average level of the sawtooth voltage Vstc and the DC voltage Ect always agree with each other, and the cross points thereof are always a half of the horizontal Line period "ts" as shown in FIGS. 12(A) and 12(B).

Figure 12B:
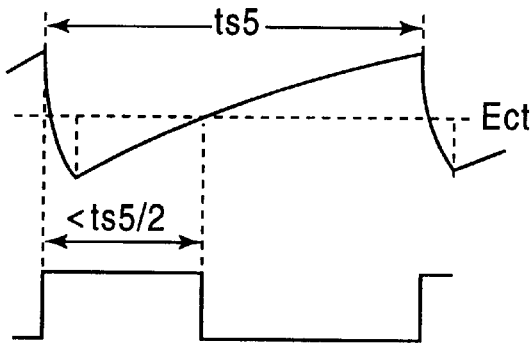

When the horizontal line time "ts" becomes longer as shown as ts5 in FIG. 12(B), a linearity of the sawtooth voltage Vstc becomes worse, and the cross point thereof shift slightly before the center. But, there occurs no problem as far is the center signal generating circuit 18 operates.

The pulse width control device 19 shown in FIG. 6 may be comprised of combining tile monostable multivibrator 17 and a frequency voltage converting device which is operated in response to the standard pulse Vs, or may be constituted by microcomputer which outputs the pulse width control signal Epw responsive to a variety of horizontal Line periods "ts".

[Second Embodiment]

The dynamic focusing apparatus of the present invention can be designed to keep the parabolic voltage constant to a variety of horizontal line period "ts" which are changed.

Figure 13:
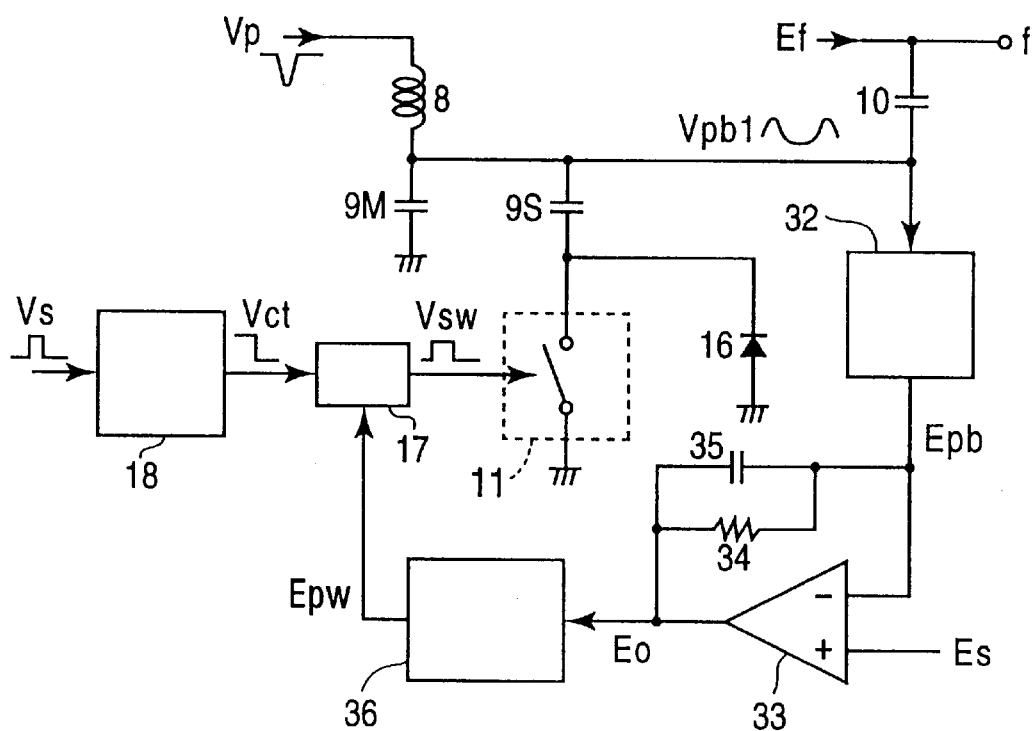
FIG. 13 shows a dynamic focusing apparatus which keeps a constant amplitude of the parabolic voltage.

FIG. 13 shows a dynamic focusing apparatus which keeps a constant amplitude of the parabolic voltage.

FIG. 13 shows an example of a dynamic focusing apparatus which keeps the parabolic voltage Vpb1 constant for various horizontal line period "ts". Compared to the dynamic focusing apparatus of FIG. 6 few devices and components are added as explained hereafter. That is, a rectifying device 32 for detecting the parabolic voltage Vpb1, an operational amplifier 33, a negative feed back resistor 34 for stabilizing, a capacitor 35 for range restriction, and a pulse width control device 36 are further provided.

In FIG. 13, the rectifying device 32 outputs a direct current voltage Epb which is proportional to the parabolic voltage Vpb1. The DC voltage Epb is supplied to an inverting terminal of the operational amplifier 33 and compared with a DC standard voltage Es which is supplied to a noninverting terminal of the operational amplifier 33. Then, the operational amplifier 3,3 outputs a DC voltage ho from an output terminal thereof as a result of the comparison. The DC voltage Eo is supplied to the pulse width control device 36. The pulse width control device 36 outputs the pulse width control signal Epw, which is supplied to the monostable multi-vibrator 17 and controls the pulse width "tmm" of the square pulse Vsw outputted therefrom.

In FIG. 13, when the parabolic voltage Vpb1 becomes larger than a standard value, the DC voltage Epb becomes larger than the DC standard voltage Es, which causes to reduce the DC, voltage Eo. Operational conditions of the pulse width control device 36 and the monostable multivibrator 17 are set to make the pulse width of the square pulse Vsw becoming longer when the direct current voltage Eo which is supplied to the pulse width control device 36 is reduced. Then, the amplitude of the parabolic voltage Vpb1 becomes small, as the period of two capacitors 9M and 9S being parallel with each other becomes long. Thus, the DC voltage Epb agrees with the standard voltage Es without fail.

The rectifying device 32 may be a half-wave rectifier or a full-wave rectifier, and each rectifier has respective characteristics in operation. When the full-wave rectifier is used therefor, the peak to peak value of the parabolic voltage pbl keeps constant. Therefore, the full-wave rectifier of the rectifying device 32 is suited to a device such as a character display device, which requires fine focus of the surround area of its picture.

When the half-wave rectifier is used therefor, a center area of a picture is stabilized by the DC voltage Epb which is obtained by rectifying the parabolic voltage Vpb1 in an amplitude range from the average thereof to the lowest peak thereof which corresponds to a middle of scanning line. This gives that a voltage Emn, which is the voltage between the average of the parabolic voltage Vpb1 and the lowest peak thereof, is made to be constant as shown in FIGS. 8(A) through 8(C). Therefore, when the parabolic voltage Vpb1 is applied to the focus voltage Ef through the DC blocking capacitor 10, the average value of the parabolic voltage Vpb1 shown as broken lines in FIGS. 8(A) through 8(C) agree with an original DC voltage of the focus voltage Ef, which does not contain the parabolic voltage Vpb1. This original DC voltage thereof is maintained constant.

Accordingly, when the voltage Emn is constant, the -focus voltage of the center area of the picture is constant regardless of the waveform of the parabolic voltage Vpb1. Therefore, the center area of the display is finely focused. Thus, the rectifying device 32 of the half-wave rectifier is suited for a TV display.

[Third Embodiment]

Figure 14:
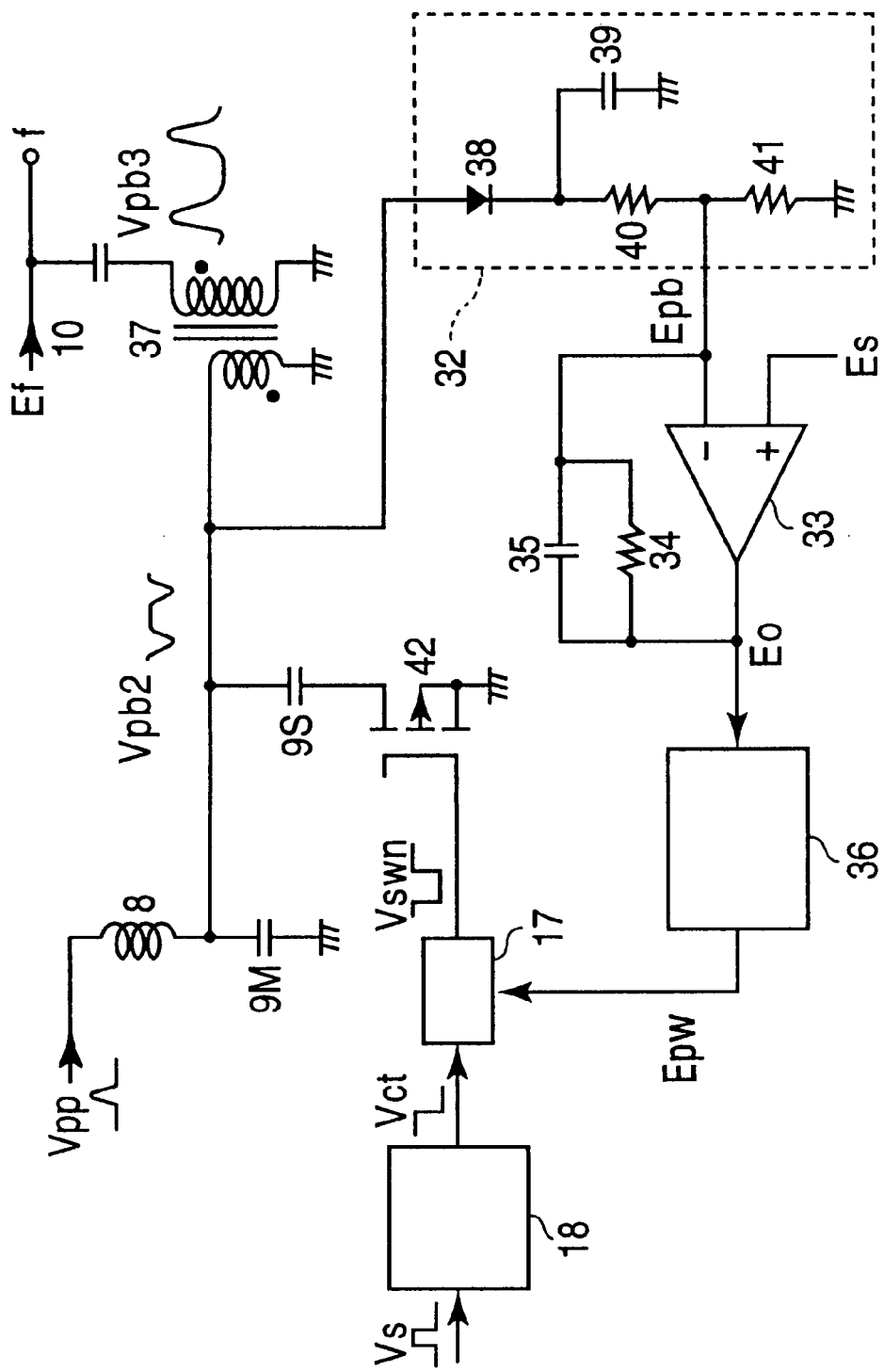
FIG. 14 shows a dynamic focusing apparatus which is supplied with a positive horizontal flyback pulse and has an output transformer.

FIG. 14 shows a dynamic focusing apparatus which is supplied with a positive horizontal flyback pulse and has an output transformer.

The horizontal flyback pulse Vp shown in FIGS. 6, and 13 for producing the parabolic voltage Vpb1 is negative. However, the horizontal flyback pulse Vp is generally positive, and FIG. 14 shows a dynamic focusing apparatus wherein the horizontal flyback pulse Vpp is made positive.

In FIG. 14, a parabolic voltage Vpb2 which appears across the capacitor 9M is a reversal of the parabolic voltage Vpb1. This negative polarity of the parabolic voltage Vpb2 is then reversed by a focus transformer 37 to produce a parabolic voltage Vpb3. The parabolic voltage Vpb3 is supplied to the focus terminal "f" through the DC blocking capacitor 10. A p-type FET 42 is used as an electronic switch which is connected to the capacitor 9S in series. A negative square pulse Vsw is outputted from the monostable multi-vibrator 17.

The focus transformer 37 reverses the polarity of the focus voltage and also boosts up the level thereof, this means that only small voltages of the parabolic voltage Vpb2, and the horizontal flyback pulse Vpp are required. Thus, the dynamic focusing apparatus and the half-wave rectifier for rectifying the parabolic voltage Vpb2 ranged from the average to the center thereof may be obtained easily by the present invention.

FIG. 14 shows a detail of the rectifying device 32. The rectifying device 32 includes a rectifying diode 38, a smoothing capacitor 39, and voltage dividing resistors 40 and 41, and outputs a positive DC voltage Epb, which is close to the standard voltage Es, and proportionate to a voltage between the average of the parabolic voltage Vpb3 and the lowest peak thereof corresponding to a middle of the scanning line. Thus, the parabolic voltage Vpb3 is kept constant.

In this embodiment, capacitors 9M, 9S for integrating are two capacitors connected in parallel each other, but more than three capacitors may be used in parallel or a plurality of capacitors may be connected in series for integrating. A construction of the dynamic focusing apparatus of the present invention is not limited to this embodiment, and may be modified within the scope of this invention.

An advantage of the dynamic focusing apparatus of the present invention is to obtain a fine focus over a full display screen by operations of a parabolic voltage generating device for generating a parabolic focus voltage by supplying a horizontal flyback pulse to a series circuit of the capacitance and the inductor, a coupling circuit for supplying the parabolic voltage to a focus electrode of a cathode-ray tube, the capacitance of the series circuit is comprised of a plurality of capacitors, an electronic switch for grounding some of the plurality of capacitors at the middle of the horizontal scanning period and for deactivating them at another period, and a switching control device for varying the switching period in response to the horizontal deflection frequency or the horizontal deflection angle.

Another advantage of the dynamic focusing apparatus of the present invention is to obtain a fine focus over a full area of the display screen by providing a parabolic focus voltage which varies steeply at both edges of the display and gradually at the center area thereof.

Further and another advantage of the dynamic focusing apparatus of the present invention is to provide an adequate dynamic focusing voltage waveform automatically responsive to the horizontal deflection frequency or the horizontal deflection angle by providing a pulse generator as a switching control device for generating a driving pulse which drives the electronic switch, as a result, a presetting device which responds to a kind of a parabolic signal and generates a driving signal is not needed.

What is claimed is:

1. A dynamic focusing apparatus comprising;
   a parabolic voltage generating means for generating a parabolic voltage across capacitor means by applying a horizontal flyback pulse to a series circuit of an inductor and said capacitor means;
   a coupling means for supplying said parabolic voltage to a focus electrode of a cathode-ray tube;
   said capacitor means including a plurality of capacitors;
   electronic switch means for connecting selectively and momentarily some of said plurality of capacitors for a time duration corresponding to an approximate middle portion of a horizontal scanning period and for disconnecting said some of said plurality of capacitors for other duration than said time duration; and
   control means for controlling said time duration.

2. A dynamic focusing apparatus claimed in claim 1, wherein said control means comprises square pulse generating means for generating a drive pulse which drives said electronic switch means, and pulse width modulating means.

3. A dynamic focusing apparatus claimed in claim 2, wherein said pulse width modulating means controls a pulse width of said drive pulse responsive to one of a horizontal deflection frequency and a horizontal deflection angle.

4. A dynamic focusing apparatus claimed in claim 2, wherein said control means further comprises a voltage detecting means for detecting a voltage generated across said capacitor means, and wherein said pulse width modulating means controls a pulse width of said drive pulse responsive to an output signal of said voltage detecting means.

5. A dynamic focusing apparatus claimed in claim 1, further comprising a transformer for reversing a polarity of said parabolic voltage and supplying said parabolic voltage to said coupling means, wherein said horizontal flyback pulse is positive and said parabolic voltage generated across said capacitor means is supplied to said transformer.

6. A dynamic focusing apparatus claimed in claim 4, further comprising a transformer for reversing a polarity of said parabolic voltage and supplying said parabolic voltage to said coupling means, wherein said horizontal flyback pulse is positive and said parabolic voltage generated across said capacitor means is supplied to said transformer.

7. A dynamic focusing apparatus comprising;
   a parabolic voltage generating means for generating a parabolic voltage across capacitor means by applying a horizontal flyback pulse to a series circuit of an inductor and said capacitor means;
   a coupling means for supplying said parabolic voltage to a focus electrode of a cathode-ray tube;
   said capacitor means including a plurality of capacitors; and
   electronic switch means for connecting selectively and momentarily some of said plurality of capacitors for a time duration corresponding to an approximate middle portion of a horizontal scanning period and for disconnecting said some of said plurality of capacitors for other duration than said time duration.

* * * * *